United States Patent [19]
Akiba et al.

[11] Patent Number: 5,883,870
[45] Date of Patent: Mar. 16, 1999

[54] DISK DEVICE WITH BRAKE MECHANISM

[75] Inventors: Takao Akiba, Ohmiya; Yo Kamei, Kokubunji; Takashi Watanabe, Ichikawa, all of Japan

[73] Assignee: Teac Corporation, Tokyo, Japan

[21] Appl. No.: 619,434

[22] Filed: Mar. 21, 1996

[30] Foreign Application Priority Data

Feb. 9, 1996 [JP] Japan ..................................... 8-024464

[51] Int. Cl.⁶ ........................... G11B 17/04; G11B 19/22
[52] U.S. Cl. ......................................... 369/77.1; 369/75.2
[58] Field of Search ................................. 369/77.1, 75.2; 360/99.02, 99.03, 99.06, 99.07

[56] References Cited

U.S. PATENT DOCUMENTS

| | | | |
|---|---|---|---|
| D. 372,228 | 7/1996 | Sawada et al. | D14/109 |
| 4,124,872 | 11/1978 | Propst | 360/98.07 X |
| 4,486,873 | 12/1984 | Takahashi et al. | 369/77.1 |
| 4,980,883 | 12/1990 | Mutou et al. | 369/77.1 X |
| 5,381,393 | 1/1995 | Ohtani | 369/77.2 |
| 5,473,593 | 12/1995 | Wheeler | 369/77.1 |

FOREIGN PATENT DOCUMENTS 62-267984 11/1987 Japan .
0223405 5/1994 Taiwan .

Primary Examiner—William R. Korzuch
Attorney, Agent, or Firm—Ladas & Parry

[57] ABSTRACT

A disk information recording medium is loaded on a tray. The tray is loaded in a frame and rotated when information is read from the disk information recording medium. The tray projects from the frame and causes the disk information recording medium to be exposed from the frame when the disk information recording medium is replaced with another one. A braking member is provided on the frame in a position such that the braking member comes into contact with the disk information recording medium when the tray having the disk information recording medium loaded thereon projects from the frame and exposes the disk information recording medium from the frame.

7 Claims, 16 Drawing Sheets

PRIOR ART

PRIOR ART

PRIOR ART

DISK DEVICE WITH BRAKE MECHANISM

BACKGROUND OF THE INVENTION

1. Field of the Invention

The present invention relates to a disk device, in particular, to a disk device in which a disk loaded on a tray is rotated at high speed and information recorded in a recording surface of the disk is read.

2. Description of the Related Art

For example, as a recording medium for storing therein information such as database and software, a compact disk from which information is reproduced through a laser pickup is used. For this purpose, a built-in CD(Compact Disk)-ROM drive device has been developed. The built-in CD-ROM is a CD-ROM which can be built into a case of a miniaturized notebook personal computer and therefor.

FIG. 1 shows a plan view of an example of the built-in CD-ROM drive device as a kind of a disk device in the related art.

In such a kind of device, a tray 1 on which a disk (not shown in the figure) is loaded, is provided, forward-and-backward (in A, B directions) slidably. The tray 1 is manually slidable. Further, below an opening 1a of the tray 1, a turntable 2 and a pickup unit 3 are provided. The turntable 2 is used for clamping the disk thereon, is driven and thus rotated by a spindle motor (not shown in the figure). The pickup unit 3 optically detects information recorded on the disk.

An ejecting mechanism incorporated in the above-described CD-ROM drive device will now be described. An ejecting operation is performed in response to an ejecting button 4 provided in a front bezel 1b of the tray 1 being pressed. When the tray 1 is loaded in the CD-ROM drive device, a holding lever 5 supported on a bottom surface of the tray 1 is held by a pin 6 provided on a chassis 10.

This holding lever 5 is L-shaped and has one end with a holding portion 5a which holds the pin 6 and the other end with a contacting portion 5b which comes into contact with the ejecting button 4. The holding lever 5 is rotatably supported by a shaft 5c and has a clockwise force applied thereto by a coil spring 7 so that the holding lever 5 tends to holds the pin 6.

At a rear portion of the tray 1, a pressing mechanism which presses the tray 1 in the A direction is provided. This pressing mechanism thus moves the tray 1 a predetermined distance so that an operator may easily draw out the tray 1 by holding a thus-projecting end of the tray 1. A projection 1c projecting downward from the bottom surface of the tray 1 has a pressing lever 8 slidably mounted thereon. The pressing lever 8 has a force applied thereto in the B direction by a coil spring 9.

In the pressing mechanism, in a process in which the tray 1 is loaded in the CD-ROM drive device, an end portion 8a of the pressing lever 8 comes into contact with a rear inner wall 10a of the chassis 10. Thereby, an operator's operation of loading the tray 1 in the CD-ROM drive device causes the coil spring 9 to be elongated by an amount of a projecting length of the end portion 8a by a pulling operation.

As shown in FIG. 2, when the ejecting button 4 is pressed by an operator, the holding lever 5 is rotated in a releasing direction (counterclockwise). Thereby, the holding of the pin 6 provided on the chassis 10 side below the tray 1 is released. The holding lever 8 thus performs a releasing operation in response to the ejecting button 4 being pressed. The force of the coil spring 9 applied to the pressing lever 5 presses the rear inner wall 10a of the chassis 10. A reaction force thereof causes the tray 1 to be pressed out in an ejecting direction (A direction) in response to the releasing operation of the holding lever 5.

As shown in FIG. 3, the front bezel 1b of the tray 1 is spaced from the chassis 10 by a predetermined distance L as a result of the above-described ejecting operation being performed. Thereby, an operator can hold the thus-projecting end of the tray 1 and draw it out. Then, the operator draws out the tray 1 having the disk loaded thereon to a disk replacement position such that the loaded disk is exposed in the disk replacement position. Then, the operator may replace the disk with a new one.

In the built-in CD-ROM drive device in the related art, when the ejecting button is pressed, a power supply to the spindle motor which drives and rotates the turntable 2 is automatically stopped. However, inertia causes a rotor of the spindle motor and the turntable 2 to continue to turn. In order to stop the continuous rotation of the turntable 2, a back electromotive force is applied to the spindle motor and the spindle motor is braked. Thus, the rotation of turntable 2 tends to stop. The disk loaded on the turntable 2 is ejected with the tray 1 after the rotation of the turntable has been stopped.

In such a built-in CD-ROM drive device, in order to improve a rate of reading information from the disk, disk rotation speed is increased to six times or eight times. In such a case of disk rotation speed increase to six times or eight times, a long time is required for the turntable 2 to stop after power supply to the spindle motor is stopped in response to the ejecting button being pressed by an operator. Therefore, when reading of information from the disk is finished and the ejecting button 4 is pressed, the tray 1 may be moved to the ejecting direction before the rotation of the disk due to inertia is completely stopped. In such a case, the disk is ejected while the disk is still turning.

SUMMARY OF THE INVENTION

An object of the present invention is to provide a disk device in which the above-described problem can be eliminated.

This is accomplished by providing a disk device according to the present invention which comprises:

a frame;

a tray on which a disk information recording medium is loaded, the tray being loaded in the frame when information is read from the disk information recording medium being rotated, and the tray projecting from the frame and causing the disk information recording medium to be exposed from the frame when the disk information recording medium loaded on the tray is replaced with another disk;

a braking member provided on the frame in a position such that the braking member comes into contact with the disk information recording medium when the tray having the disk information recording medium loaded thereon projects from the frame and causes the disk information recording medium to be exposed from the frame.

The position at which the braking member is located may be such that the braking member comes into contact with a non-recordable surface of the disk information recording medium when the tray having the disk information recording medium loaded thereon projects from the frame and causes the disk information recording medium to be exposed from the frame.

Instead, the position at which the braking member is located may be such that the braking member comes into contact with a circumference of the disk information recording medium when the tray having the disk information recording medium loaded thereon projects from the frame and causes the disk information recording medium to be exposed from the frame.

According to the present invention, even in a case where a disk information recording medium is caused to rotate at high speed in an information reading operation, thereby high-speed information reading being enabled, a braking member slides on the non-recordable surface or the circumference of the disk information recording medium when a tray thereof is drawn out together with the disk information recording medium. As a result, the disk information recording medium is braked to stop turning. Thus, the disk information recording medium can be ejected in a state in which the disk information recording medium has stopped turning.

Other objects and further features of the present invention will become more apparent from the following detailed description when read in conjunction with the accompanying drawings.

DETAILED DESCRIPTION OF PREFERRED EMBODIMENTS

Figure 1:
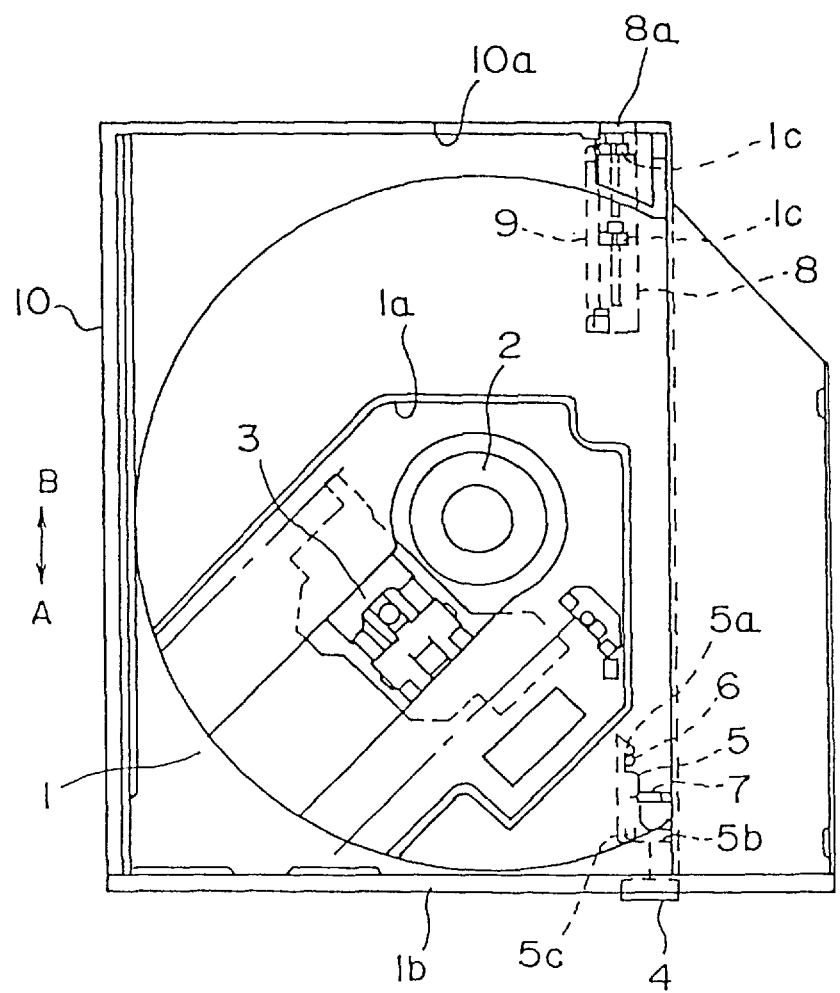
FIG. 1 shows a plan view of an example of a built-in CD-ROM drive device in the related art.
Figure 2:
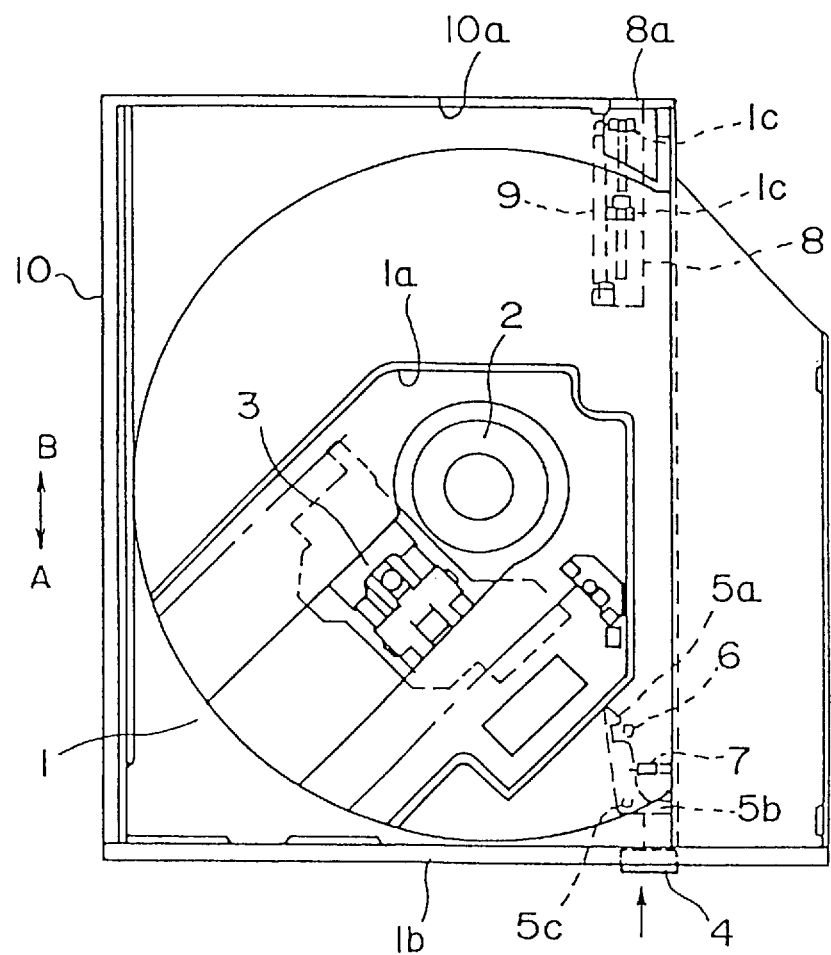
FIGS. 2 and 3 show plan views for illustrating a disk ejecting operation in the CD-ROM drive device shown in FIG. 1.
Figure 3:
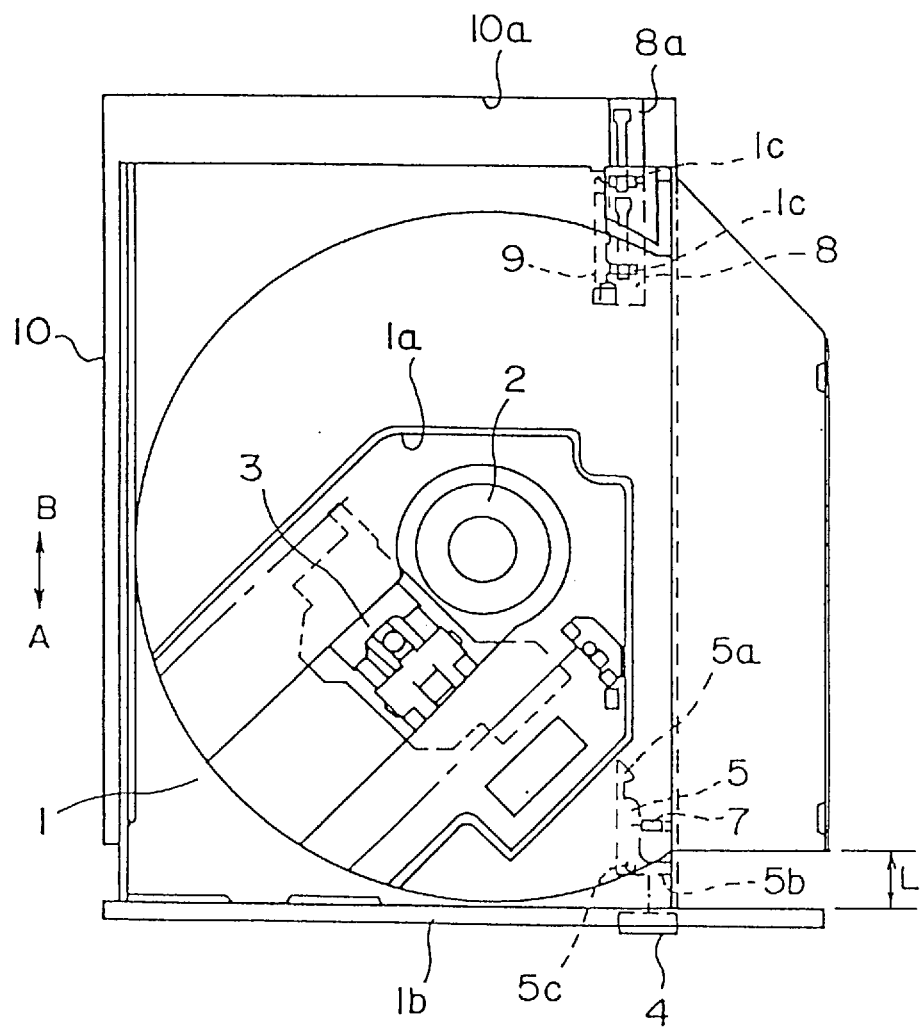
Figure 4:
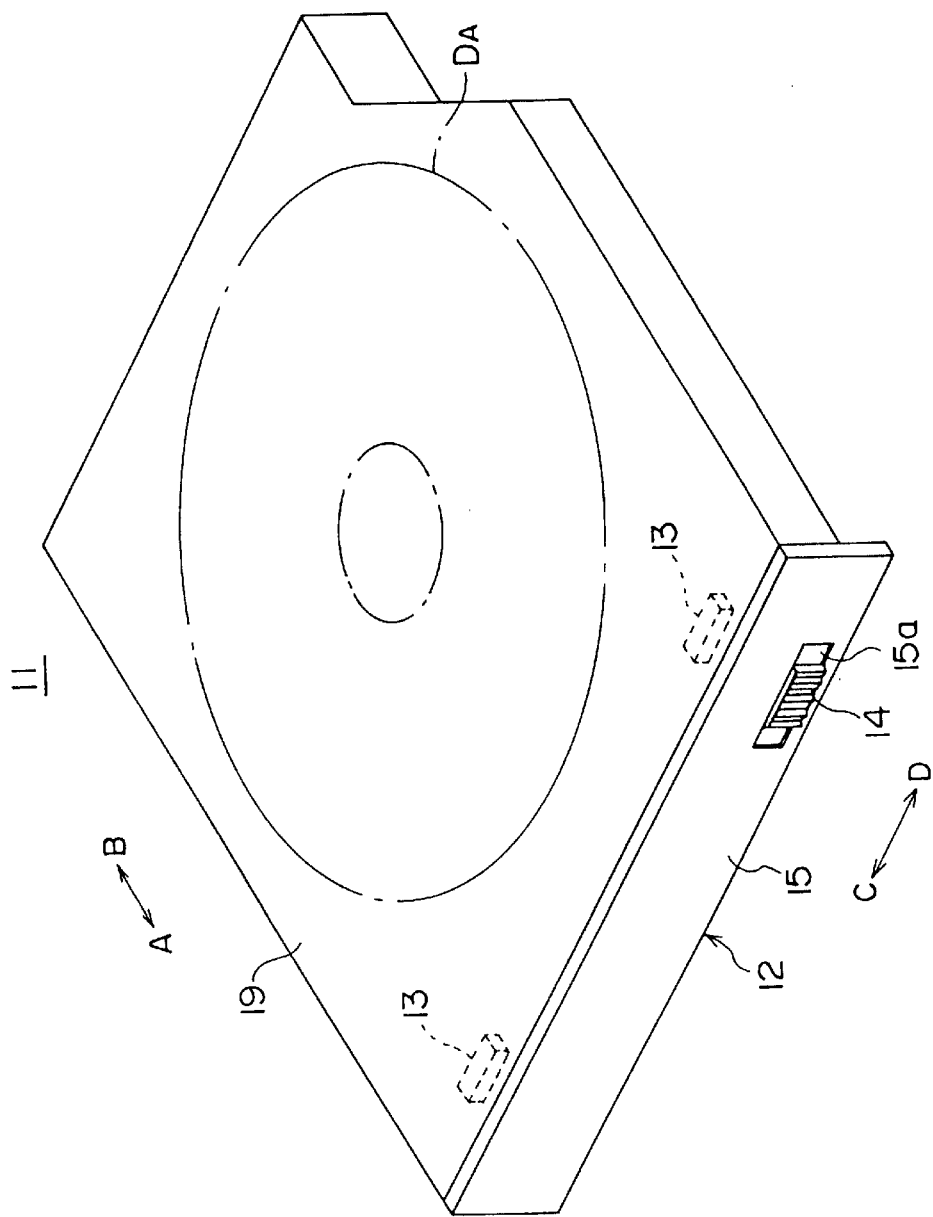
FIG. 4 shows a perspective view of a CD-ROM drive device in a first embodiment of a disk device according to the present invention.

FIG. 4 shows a CD-ROM drive device in a first embodiment of a disk device according to the present invention.

The CD-ROM drive device 11 is a built-in device which is built into a case of a notebook personal computer (not shown in the figure).

The CD-ROM drive device 11 is provided with a tray 12 which is slidable in a forward-and-backward (in A and B directions) movement, for receiving a disk DA (indicated by a chain line in the figure) serving as an information recording medium. When the disk is loaded, the tray 12 slides in the B direction, so as to be held in the CD-ROM drive device 11. A front bezel 15 of the tray 12 has a horizontally extending rectangular fitting hole 15a formed therein.

An ejecting-operation switch 14 is fitted, slidably in the fitting hole 15a of the front bezel 15 of the tray 12 along a longitudinal axis of the fitting hole 15a. The ejecting-operation switch 14 normally has a force in the D direction applied thereto. When causing the tray 12 to perform a disk ejecting operation, an operator operates and thus slides the switch 14 in the C direction.

The above-described slidable arrangement of the ejecting-operation switch 14 is advantageous. In fact, for example, there is a possibility that an operator could erroneously come into contact with the switch 14 when operating a keyboard of a notebook personal computer (not shown in the figure) having the CD-ROM drive device built therein. Even in such a case, there is a very small possibility that the operator erroneously contacts and substantially slides the ejecting-operation switch 14. Therefore, there is a very small possibility that the tray 12 is erroneously caused to perform the disk ejecting operation.

On the bottom surface of and near the front end of a top plate 19 which covers the top side of the tray 12, a pair of braking members 13 (indicated by broken lines) are provided. The pair of braking members 13 is caused to slide on a label side (non-recording side, the top side in the figure) of the disk $D_A$ and thus brake the disk $D_A$. A soft material such as felt or sponge, for example, is used as the braking members 13. Therefore, the braking members 13 do not harm the sliding surface of the disk $D_A$. Further, the braking members 13 are shaped and located so that each of the braking members 13 extend along horizontal directions (the C and D directions) perpendicular to a disk $D_A$ ejection direction (the A direction). The braking members 13 have areas with which the braking members 13 slide on the disk $D_A$ surface, and the areas are so wide that the braking members 13 may effectively brake the disk $D_A$.

Further, as will be described later, an operator's sliding of the ejecting-operation switch 14 in the C direction causes the tray 12 to move in the A direction to perform the disk ejecting operation, and the operator draws the front bezel 15 of the tray 12 in the A direction. Thereby, the top surface of the disk $D_A$ has the pair of braking members 13 slide thereon. Thus, during a process of the tray 12 performing the disk ejecting operation, inertia rotation of the disk $D_A$ is braked by friction between the top surface of the disk $D_A$ and the braking members 13. As a result, the disk $D_A$ is drawn out together with the tray 12 to a disk replacement position in a state in which the disk $D_A$ has stopped rotating.

Figure 5:
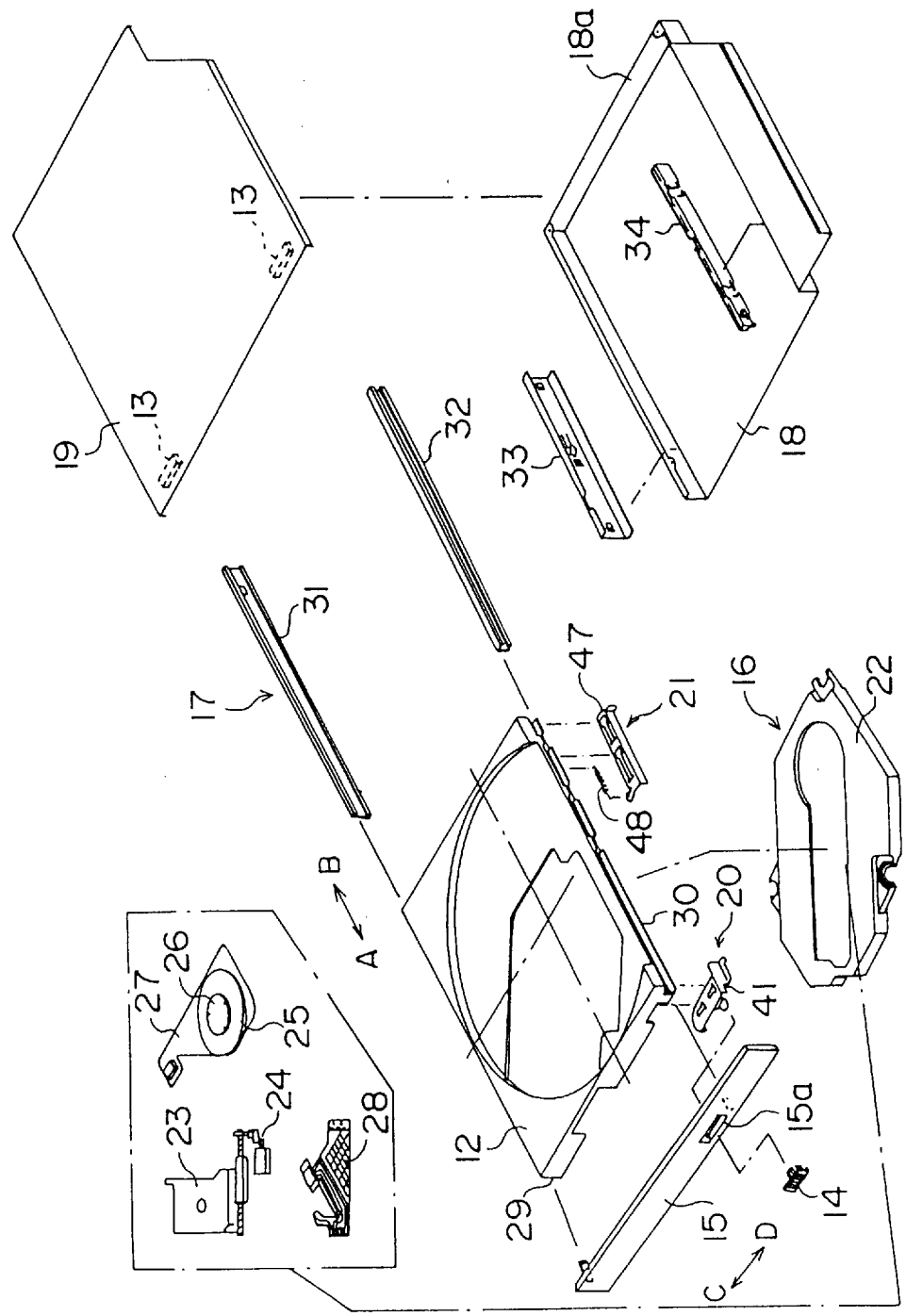
FIG. 5 shows an exploded, perspective view of the CD-ROM drive device shown in FIG. 4.

FIG. 5 shows an exploded, perspective view of the CD-ROM drive device 11.

The CD-ROM drive device 11 includes the above-described tray 12, a driving unit 16, a tray guiding mechanism 17, a chassis 18 and the top plate 19. The driving unit 16 is fixed on the bottom surface of the tray 12. The tray guiding mechanism 17 guides the sliding operation of the tray 12. The chassis 18 supports the tray 12. The top plate 19 is fixed to the chassis so as to cover the top of the tray 12 which has been loaded in the CD-ROM drive device 11. The pair of braking members 13 (indicated by broken lines in the figure) are fixed on the bottom surface of and near the front end of the top plate 19.

The tray 12 has a length in the C and D directions shorter than the diameter of the disk (not shown in FIG. 5) and therefore a part of the disk (not shown in FIG. 5) loaded on the tray 12 projects from an end of the tray 12. The tray 12 comes to the disk replacement position when manually slid in the A direction, and to a disk loading position when manually slide in the B direction. Therefore, no active driving mechanism (such as that including a motor and a power transmission mechanism, for example) for driving the tray 12 in the A and B directions is provided in the CD-ROM drive device 11. As a result, it is possible to reduce the number of parts/components required for manufacturing the CD-ROM drive device 11. Therefore, it is possible to miniaturize and slim the CD-ROM drive device 11.

Further, the tray 12 has an ejecting mechanism 20 provided on the bottom surface and near the front end thereof. The ejecting mechanism 20 operates in response to sliding of the ejecting-operation switch 14. On the bottom surface and near the rear end of the tray 12, a pressing mechanism 21 is provided which presses the tray 12 in the ejecting direction (A direction).

The above-mentioned driving unit 16 includes a base 22, a pickup unit 23, a pickup driving unit 24, a turntable 26, and a flexible circuit board 28. The base 22 is fixed on the bottom surface of the tray 12. The pickup unit 23 is mounted on the base 22. The pickup driving unit 24 causes the pickup unit 23 to move along a disk radius direction. The turntable 26 is rotated by a spindle motor 25. The flexible circuit board 28 electrically connects the pickup unit 23 with a substrate 27 of the spindle motor 25.

The tray guiding mechanism 17 includes slide rails 31, 32 and guiding members 33, 34. The slide rails 31, 32 slidably engage with engagement portions 29, 30 provided on two side outer walls of the tray 12, respectively. The guiding members 33, 34 are fixed on two side inner walls of the chassis 18, and slidably support the slide rails 31, 32, respectively.

In this tray guiding mechanism 17, as the tray 12 is drawn in the A direction, the slide rails 31, 32 slide in the same direction. Thus, the tray 12 being drawn in the disk ejecting operation slides to the disk replacement position while being supported by the guiding members 33, 34 via the slide rails 31, 32.

Figure 6:
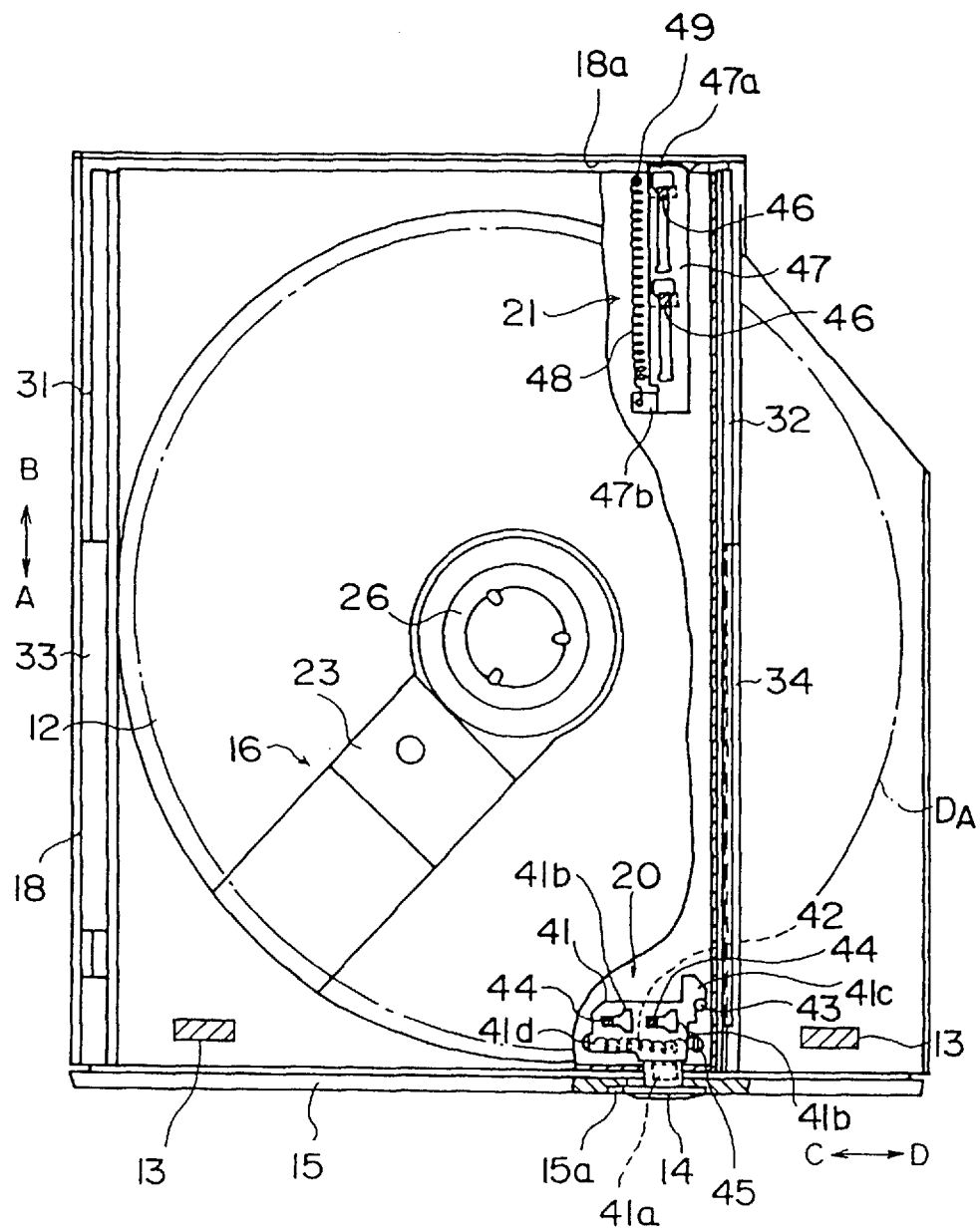
FIG. 6 shows a plan view of the CD-ROM drive device shown in FIG. 4 in a state in which a tray has been loaded in the CD-ROM drive device.

FIG. 6 shows a plan view of the ejecting mechanism 20 and the pressing mechanism 21 when the tray 12 is held in the disk loading position.

After the disk $D_A$ is clamped on the turntable 26, when the tray 12 is moved to the disk loading position, the tray 12 is held in the CD-ROM drive device 11 in the disk loading position. At this time, the disk $D_A$ reaches the disk loading position after passing through the pair of braking members 13. However, after the disk $D_A$ has reached the disk loading position, the disk $D_A$ is spaced from the pair of braking members 13. Therefore, the pair of braking members 13 do not prevent the disk $D_A$ from smoothly turning and do not prevent a smooth information reading operation performed on the turning disk $D_A$ through the pickup unit 23.

The ejecting mechanism 20 incorporated in the CD-ROM drive device 11 performs a disk ejecting operation in response to a sliding operation performed on an ejecting-operation switch 14 provided in a front bezel 15 of the tray 12. The ejecting mechanism 20 includes a holding member 41 slidable in the C, D-direction and supported on the bottom surface of the tray 12, a coil spring 42 which applies a force to the holding member 41 in the D direction and a pin 43 which stands on the chassis 18.

The holding member 41 includes a coupling portion 41a, a pair of holes 41b, a holding portion 41c and a spring hooking portion 41d. The ejecting-operation switch 14 is coupled with the coupling portion 41a. The pair of holes 41b engage with a pair of projections 44 which project from the bottom surface of the tray 12, respectively. By this engagement, slidable directions of the holding member 41 are limited to the C and D directions. The holding portion 41c is hook-shaped and is directly held by the pin 43. An end of the coil spring 42 is hooked by the spring hooking portion 41d. The other end of the coil spring 42 is hooked by a spring hooking portion 45 which stands on the chassis 18.

Thus, the holding member 41 is supported on the tray 12, slidable in the C, D directions which are perpendicular to the directions (A, B directions) in which the tray 12 moves. An elastic force of the coil spring 42 causes the holding portion 41c to be held in a position at which the holding portion 41c is held by the pin 43. When an operator operates the ejecting-operation switch 14 so as to slide the switch in the C direction, the holding member 41 slides in the same direction. Thereby, the holding portion 41c of the holding member 41 separates from the pin 43 and thus moves to a releasing position.

In the ejecting mechanism 20, when the tray 12 is loaded in the CD-ROM drive device 11, the holding portion 41c of the holding member 41 which is supported on the bottom surface of the tray 12 is held by the pin 43 provided on the chassis 18. Thereby, the tray 12 is held in the disk loading position.

The pressing mechanism 21 presses the tray 12 in the disk ejecting direction (A direction). Thereby, the tray 12 moves a predetermined distance and thereby it is easy for an operator to draw the tray 12 in the A direction to the disk replacement position. In the pressing mechanism 21, a pressing lever 47 engages with a pair of projections 46 so that the pressing lever 47 is slidable in the A, B directions. These projections 46 project from the bottom surface of the tray 12. The pressing lever 47 has a force applied thereto in the B direction by a coil spring 48.

An end of the coil spring 48 is hooked on a spring hooking portion 47b which is provided at the front end of the pressing lever 47. The other end of the coil spring 48 is hooked on a spring hooking pin 49 which is provided on the bottom surface of the tray 12. The coil spring 48 presses the tray 12 in the A direction which is perpendicular to the C, D directions in which the ejecting-operation switch 14 and the holding member 41 slide. The ejecting-operation switch 14 and holding member 41 prevent the tray 12 from sliding in the A direction due the elastic force of the coil spring 48.

In the pressing mechanism 21, during a process in which the tray 12 is loaded in the CD-ROM drive device 11, a rear end portion 47a of the pressing lever 47 comes into contact with a rear inner wall 18a of the chassis 18. Thereby, the loading operation of the tray 12 causes the end portion 47a of the pressing lever 47 to be pressed by the inner wall 18a of the chassis 18. Thus, a state shown in FIG. 8 becomes a state shown in FIG. 6. As a result, the pressing lever 47 moves, a distance corresponding to a length which the pressing lever projects from the rear end of the tray 12 in the state shown in FIG. 7, with respect to the tray 12, in the A direction. Accordingly, the coil spring 48 is pulled by the hooking portion 47b of the pressing lever 47 and thus elongated by the same length. Thereby, in the disk loading position in which the tray 12 has been loaded in the CD-ROM drive device 11, the pressing lever 47 presses the rear inner wall 18a of the chassis 18 with the elastic force of the coil spring 48. By a reaction force of the elastic force, the tray 12 is pressed in the disk ejecting direction (A direction).

Figure 7:
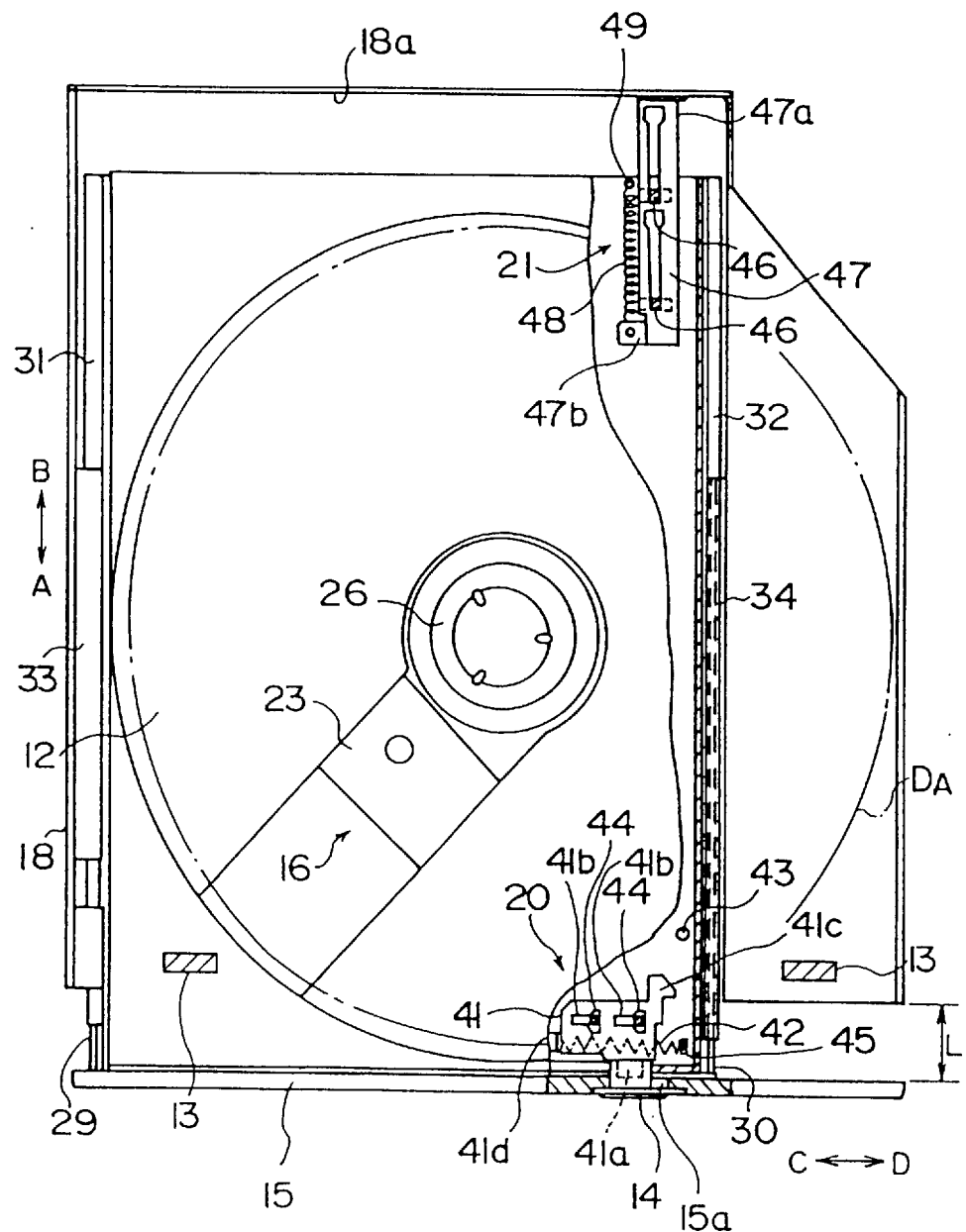
FIG. 7 shows a plan view of the CD-ROM drive device shown in FIG. 4 for illustrating an operation initiated by an operator's ejecting operation.

Operations of the above-described ejecting mechanism 20 and pressing mechanism 21 will now be described. FIG. 7 shows a plan view of a state in which the ejecting-operation switch 14 is operated and. thus slid by an operator, and thereby the tray 12 is pressed and thus moves in the disk ejecting direction (A direction).

As shown in FIG. 7, when the ejecting-operation switch 14 is operated and slides in the C direction, the holding member 41 slides together in the same direction. As a result, the hook-shaped holding portion 41c separates from the pin 43 which stands on the chassis 18. Thus, the holding of the tray 12 to the chassis 18 by the holding member 41 is released.

When the holding of the tray 12 to the chassis 18 is released as mentioned above, since the pressing lever 47 of the pressing mechanism 21 presses the rear inner wall 18a of the chassis 18 with the elastic force of the coil spring 48, the reaction force of the pressing force causes the tray 12 to be pressed and thus moves in the disk ejecting direction (A direction).

By the above-described disk ejecting operation, the front bezel 15 of the tray 12 moves to a position spaced a distance L, shown in FIG. 7, from the front end of the chassis 18. Thus, the tray 12 is pressed out to a position and as a result an operator may easily draw out the tray 12 manually. In this state, as shown in FIG. 7, the disk $D_A$ does not come into contact with either of the pair of braking members 13 which are provided on the bottom surface of the top plate 19.

Figure 8:
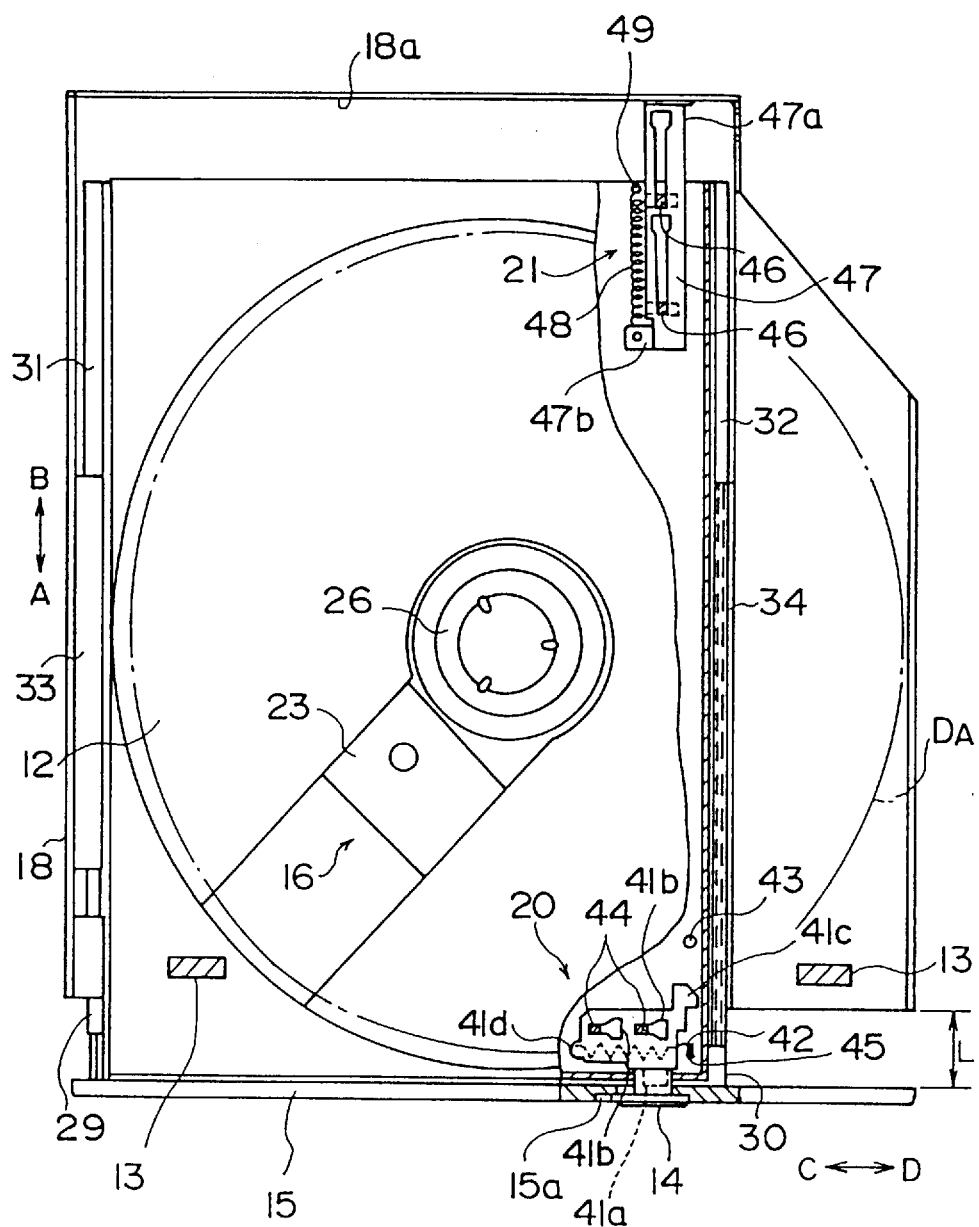
FIG. 8 shows a plan view of the CD-ROM drive device shown in FIG. 4 in a state in which an ejecting-operatin switch has returned to an original position after the operator's ejecting operation.

As shown in FIG. 8, when the operator moves his or her hand from the ejection-operation switch 14, the elastic force of the coil spring 42 causes the ejecting-operation switch 14 and the holding member 41 to move in the D direction and thus return to the original position. When the operator replaces the disk $D_A$ with a new one, and then operates and presses the front bezel 15 of the tray 12 in the B direction, a slanting edge of the hook-shaped holding portion 41c of the holding member 41 slides on the pin 43 which stands on the chassis 18. Thus, the holding member 41 moves in the C direction. Then, after the slanting edge of the holding portion 41c has passed through the pin 43, the holding member 41 moves in the D direction and returns to the original position shown in FIG. 8.

Figure 9:
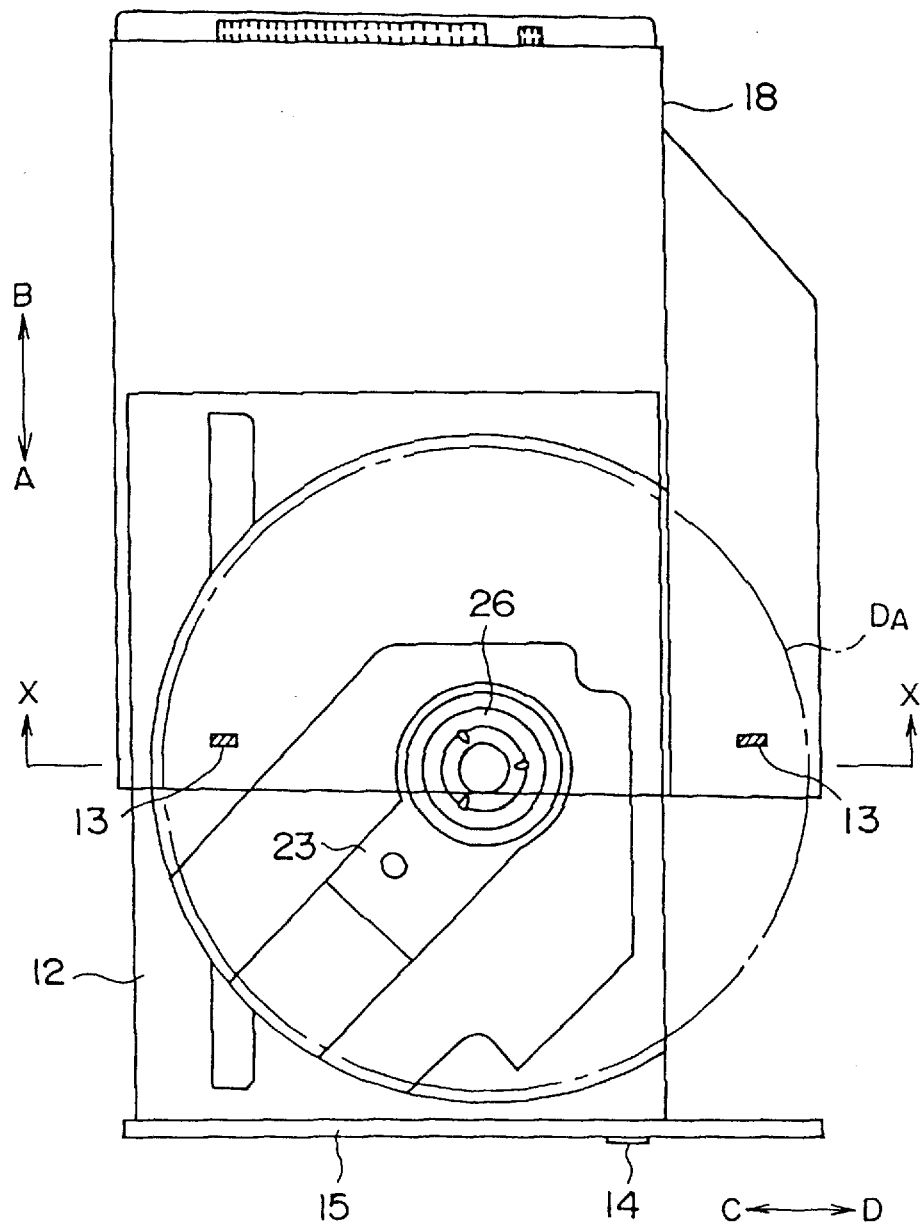
FIG. 9 shows a plan view of the CD-ROM drive device shown in FIG. 4 for illustrating a process in which the tray is drawn out.
Figure 10:
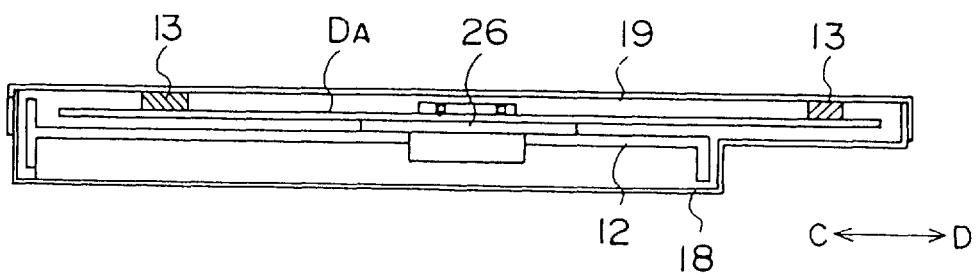
FIG. 10 shows an elevational sectional view of the CD-ROM drive device shown in FIG. 4 taken along a line X—X in FIG. 9.
Figure 11:
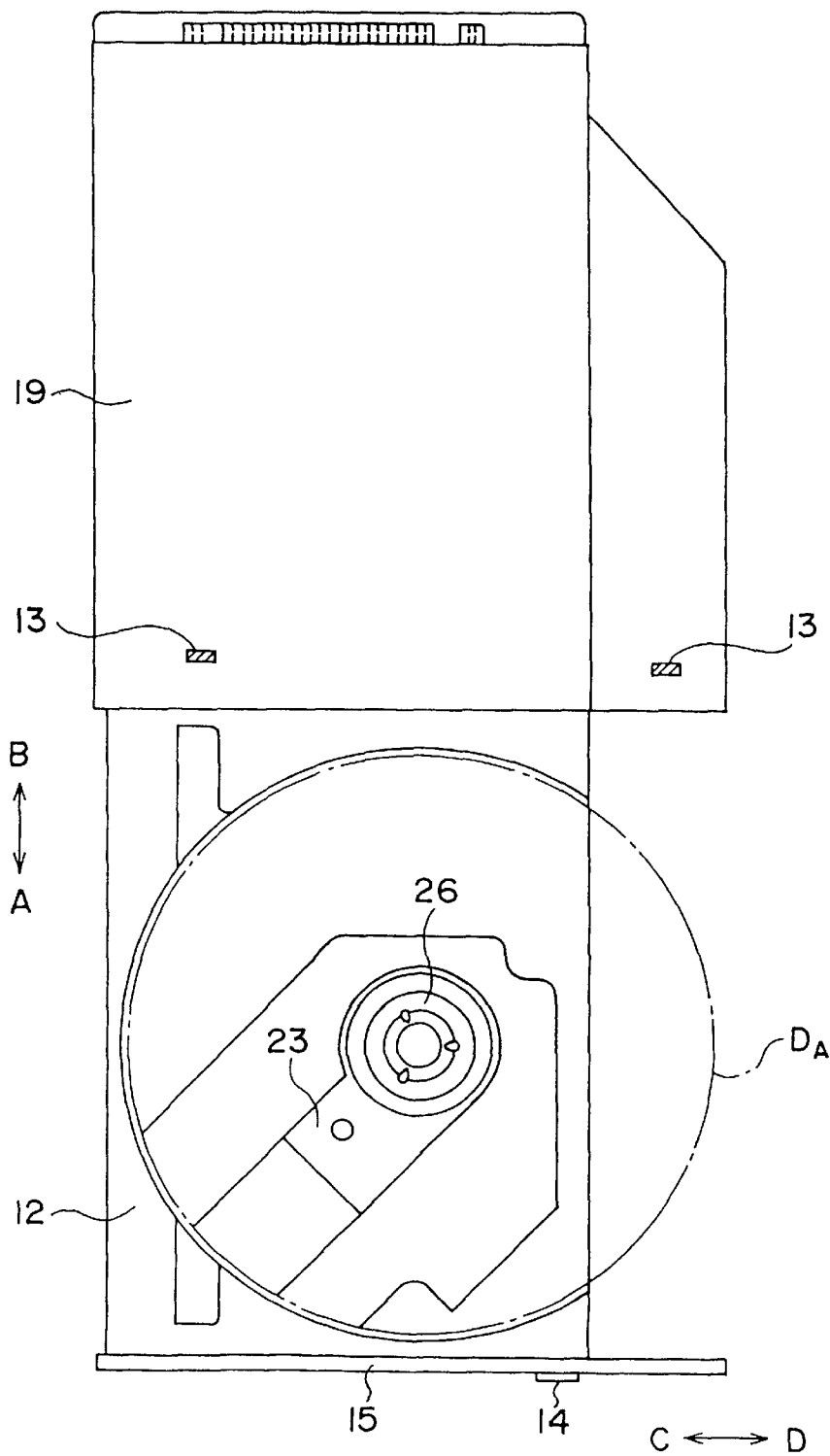
FIG. 11 shows a plan view of the CD-ROM drive device shown in FIG. 4 in a state in which the tray has been drawn out to a disk replacement position.

FIG. 9 shows a plan view illustrating a process in which the tray 12 is drawn out, FIG. 10 shows an elevational sectional view taken along a line X—X in FIG. 9 and FIG. 11 shows a plan view of a state in which the tray 12 has been drawn out to the disk replacement position.

As shown in FIG. 9, after the pressing mechanism 21 has performs the disk ejecting operation described above, the operator holds the front bezel 15 which projects from the chassis 18. Then the operator pulls the front bezel 15 in the A direction. Thereby, the tray 12 slides in the A direction being supported by the guiding members 33, 34 via the slide rails 31, 32, as the slide rails 31, 32 which support the tray 12 at the two sides thereof slide.

As shown in FIG. 10, as a result of the sliding movement of the tray 12 described above, the pair of braking members 13 which are provided on the bottom surface of the top plate 19 slide on the top surface of the disk $D_A$. Thereby, the disk $D_A$ which continues to turn due to inertia is braked. As a result, friction between the disk $D_A$ and the pair of braking members 13 causes the disk $D_A$ to stop turning.

As shown in FIG. 11, the disk $D_A$ has thus passed through the pair of braking members 13, and then the tray 12 reaches the disk replacement position at which the entirety of the disk $D_A$, loaded on the turntable 26, is exposed. Due to the friction with the pair of braking members 13 causing the disk $D_A$ to stop turning as described above, the disk $D_A$ has been ejected as shown in FIG. 11 in a state in which the disk $D_A$ has stopped turning. As a result, the operator can easily remove the disk $D_A$ from the tray 12 and replace it with a new one.

After the disk replacement, the operator operates and presses the front bezel 15 of the tray 12 in the B direction. After the tray 12 moves in the B direction, the slanting edge of the hook-shaped holding portion 41c of the holding member 41 slides on the pin 43 which stands on the chassis 18. Thus, the holding member 41 moves in the C direction. After the slanting edge of the holding portion 41c has passed through the pin 43, the holding member 41 moves in the D direction and returns to the original position shown in FIG. 6. Thus, an engagement between the holding portion 41c of the holding member 41 and the pin 43 causes the tray 12 to be held to the chassis 18 in the original disk loading position.

Figure 12:
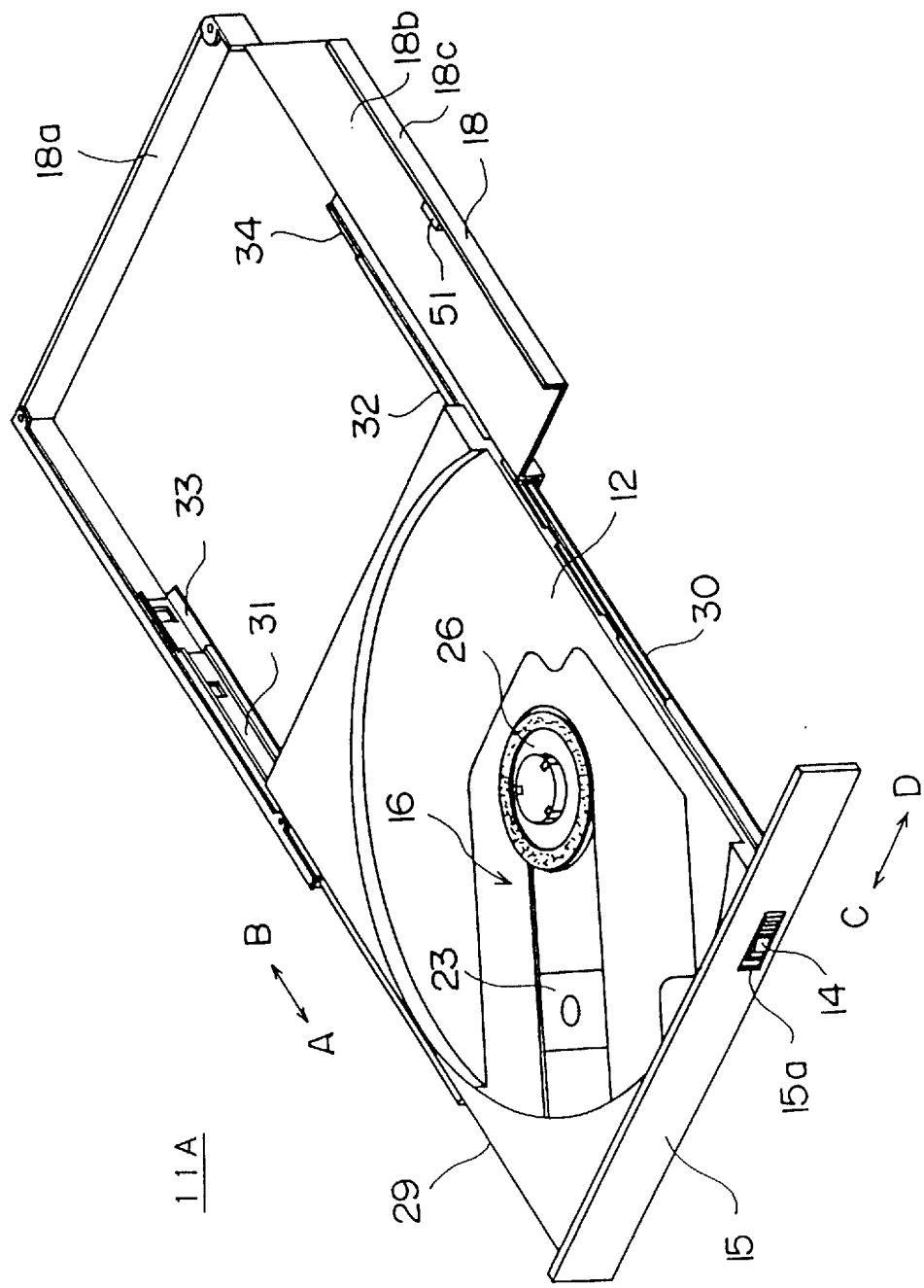
FIG. 12 shows a perspective view of a CD-ROM drive device in a second embodiment of a disk device according to the present invention.
Figure 13:
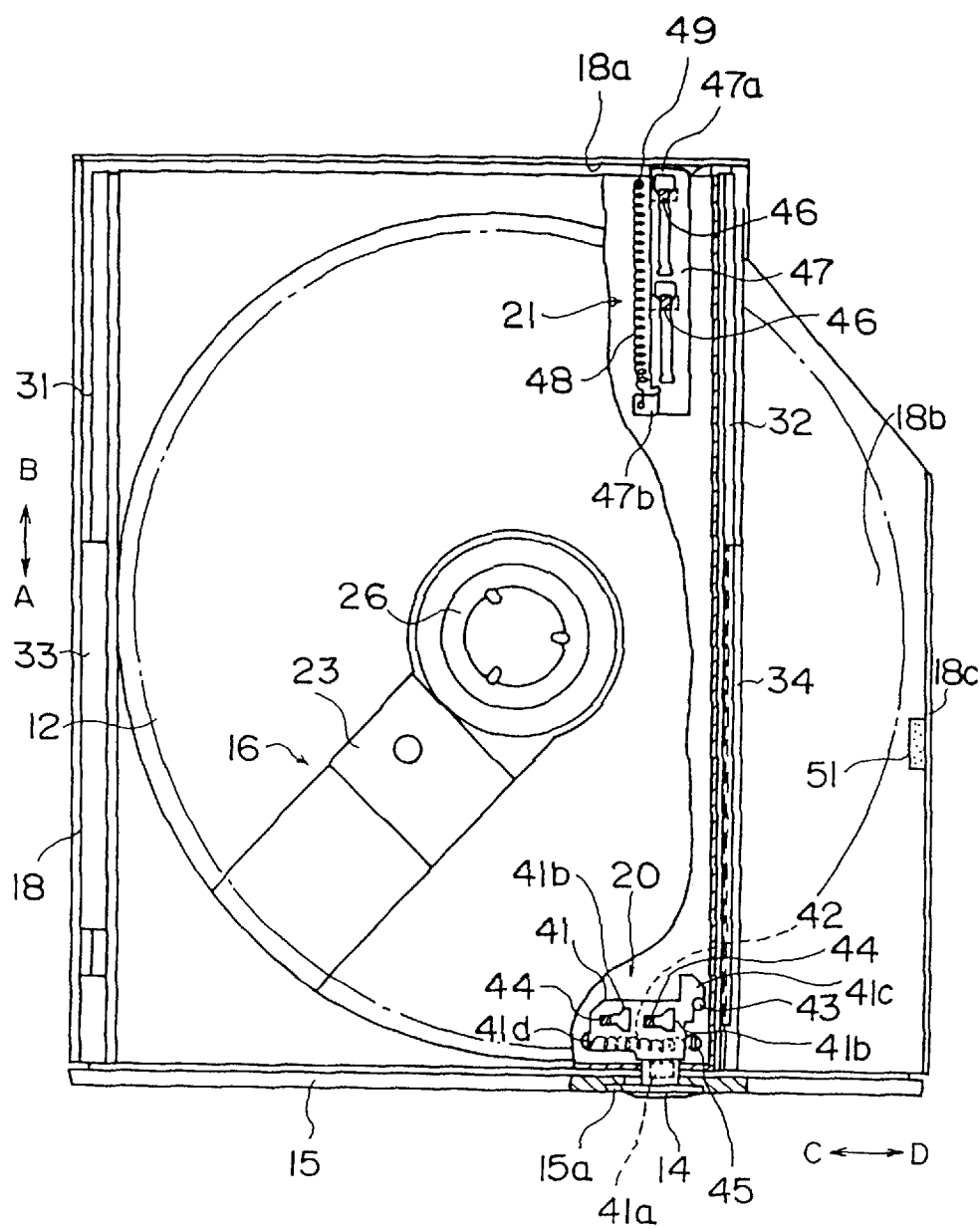
FIG. 13 shows a plan view of the CD-ROM drive device shown in FIG. 12 in a state in which the tray is in a disk loading position.

A CD-ROM drive device in a second embodiment of the present invention will now be described. The CD-ROM drive device 11A in the second embodiment is the same as the CD-ROM drive device 11 in the first embodiment, except that the pair of the braking members 13 in the first embodiment are replaced with a braking member 51 in the second embodiment. Parts/components identical to those in the first embodiment are given the same reference numerals, and therefore description thereof will be omitted. FIG. 12 shows a perspective view of the CD-ROM drive device in the second embodiment in a state in which the top plate 19 has been removed therefrom. FIG. 13 shows a plan view of the CD-ROM drive device in the second embodiment in a state in which the tray 12 is in the disk loading position.

The braking member 51 is fixed on an inner surface of a side wall 18c which stands on an edge of a extension portion 18b which extends rightward from the chassis 18 as shown in FIG. 12. When the tray 12 performs the disk ejecting operation, the braking member 51 slides on the circumference of the disk $D_A$ shown in FIG. 13. A soft material such as felt or sponge, for example, is used as the braking member 51. Therefore, the braking member 51 does not harm the circumference of the disk $D_A$.

The braking member 51 is provided in a position such that, when the tray is loaded in the CD-ROM drive device 11A and thus is in the disk loading position, the braking member 51 is spaced from the disk $D_A$. Therefore, the braking member 51 does not prevent a smooth information reading operation through the pickup unit 23 performed on the turning disk $D_A$.

Figure 14:
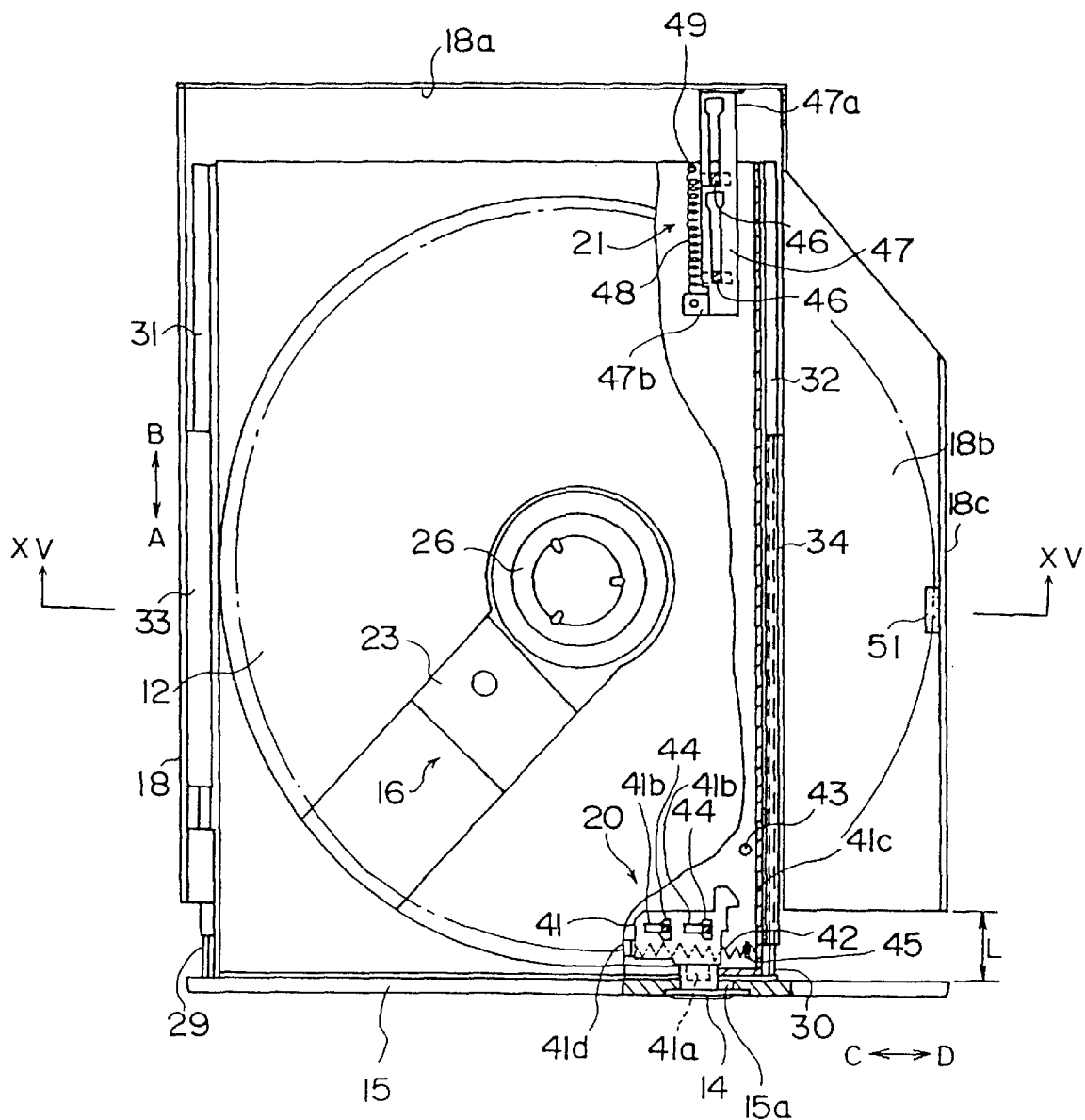
FIG. 14 shows a plan view of the CD-ROM drive device shown in FIG. 12 for illustrating a disk ejecting operation of the tray.

FIG. 14 shows a plan view for illustrating a state in which the braking member 51 slides on the circumference of the disk $D_A$ during the disk ejecting operation of the tray 12.

Figure 15:
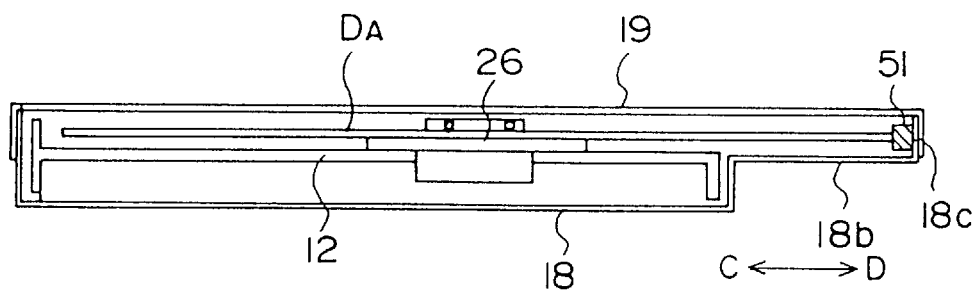
FIG. 15 shows an elevational sectional view of the CD-ROM drive device shown in FIG. 12 taken along a line XV—XV in FIG. 14.

FIG. 15 shows an elevational sectional view taken along a line XV—XV in FIG. 14.

As shown in FIG. 14, when the ejecting-operation switch 14 is operated and slides in the C direction, the holding member 41 slides in the same direction. As a result, the hook-shaped holding portion 41c separates from the pin 43 which stands on the chassis 18. Thus, the holding of the tray 12 to the chassis 18 by the holding member 41 is released. When the holding of the tray 12 to the chassis 18 is released as mentioned above, since the pressing lever 47 of the pressing mechanism 21 presses the rear inner wall 18a of the chassis 18 with the elastic force of the coil spring 48, the reaction force of the pressing force causes the tray 12 to be pressed and thus moved in the disk ejecting direction (A direction).

By the above-described disk ejecting operation, the front bezel 15 of the tray 12 moves and is positioned at a distance L, shown in FIG. 14, from the front end of the chassis 18. Thus, the tray 12 is pressed out to a position and as a result an operator may easily draw out the tray 12 manually.

Thus, the tray 12 moves in the disk ejecting direction (A direction) from the disk loading position inside the CD-ROM drive device 11A. The circumference of the disk $D_A$ has the braking member 51 slide thereon, which braking member is provided on the inner surface of the side wall 18c of the chassis 18. As a result, the disk $D_A$ which continues to turn due to inertia is braked. As a result, friction between the disk $D_A$ and the braking member 51 causes the disk $D_A$ to stop turning.

In the second embodiment, the braking member 51 slides on the circumference of the disk $D_A$ and brakes the disk $D_A$. This braking method in the second embodiment is advantageous in comparison to the braking method in the first embodiment in which the braking members 13 slides on the top surface of the disk $D_A$. That is, it is possible to increase braking torque in the braking operation in the second embodiment more than in the first embodiment. Therefore, it is possible to shorten the time required for the disk $D_A$, even turning at high speed, to stop turning through the braking operation.

Further, in the method of the first embodiment, after the ejecting mechanism 20 has performed the disk ejecting operation and the state shown in FIG. 8 occurs, the pair of braking members 13 do not come into contact with the disk $D_A$. Then, when the operator pulls the front bezel 15 and draws the tray 12, the brake members 13 first come into contact with and thus brake the disk $D_A$. Therefore, the operator should apply a force, when pulling the tray 12, against the friction between the disk $D_A$ and the pair of braking members 13. In contrast to this, in the method of the second embodiment, after the ejecting mechanism 20 has performed the disk ejecting operation and the state shown in FIG. 16 occurs, the braking member 51 comes into contact with and thus brakes the disk $D_A$. As a result, the operator should not require a force, when pulling the tray 12, against the friction between the disk $D_A$ and the braking member 51. The operator should apply a force, merely at the beginning of tray pulling, for causing the disk $D_A$ to roll on the braking member 51. Thus, it is easier to draw the tray 12 in the second embodiment than in the first embodiment.

Figure 16:
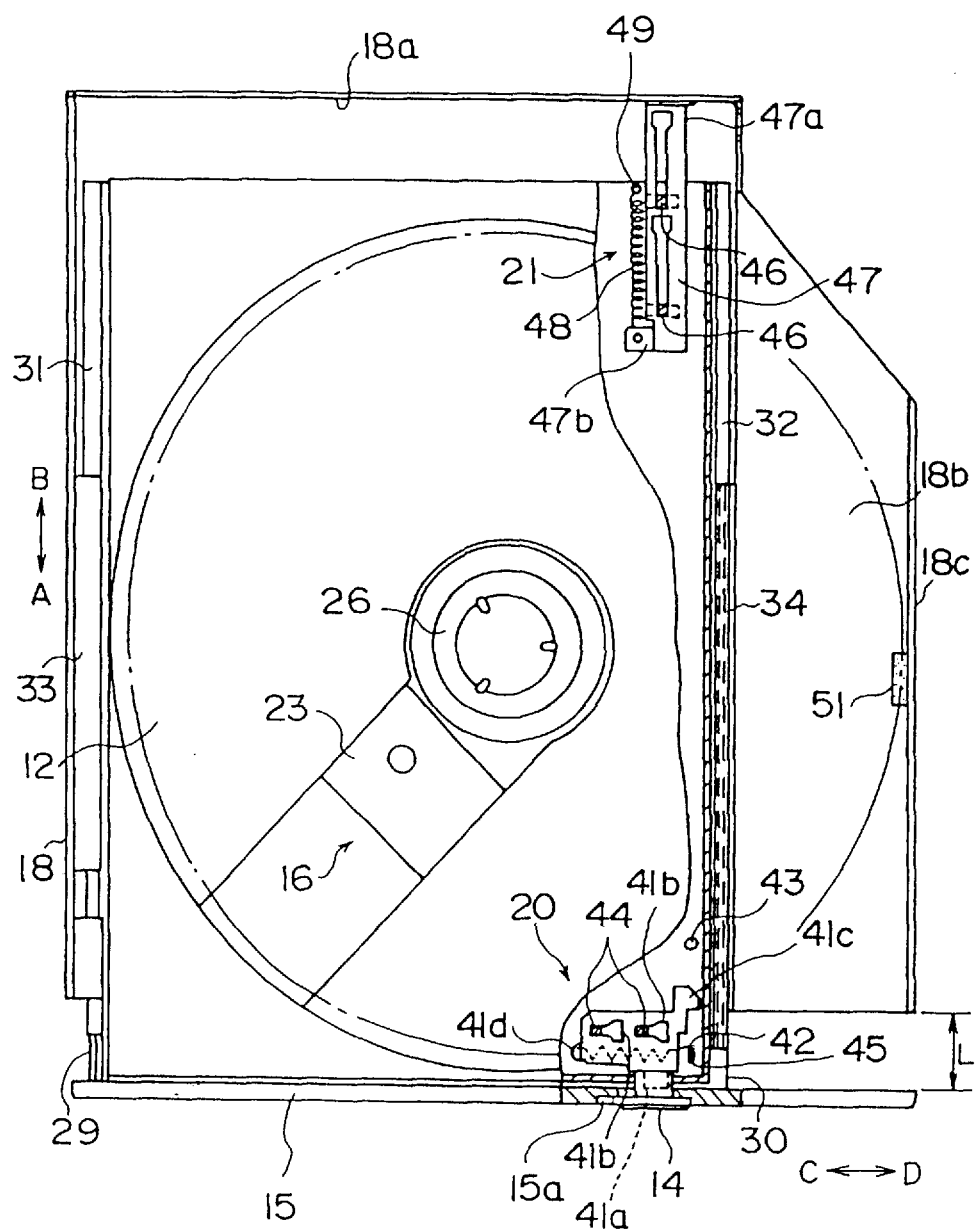
FIG. 16 shows a plan view of the CD-ROM drive device shown in FIG. 12 in a state in which the ejecting-operation switch has returned to the original position after the operator's ejecting operation.

As shown in FIG. 16, when the operator removes his or her hand from the ejection-operation switch 14, the elastic force of the coil spring 42 causes the ejecting-operation switch 14 and the holding member 41 to move together in the D direction and thus return to the original position. When the operator replaces the disk $D_A$ with a new one, and then operates and presses the front bezel 15 of the tray 12 in the B direction, the slanting edge of the hook-shaped holding portion 41c of the holding member 41 slides on the pin 43 which stands on the chassis 18. Thus, the holding member 41 moves in the C direction. Then, after the slanting edge of the holding portion 41c has passed through the pin 43, the holding member 41 moves in the D direction and returns to the original position shown in FIG. 16.

After the pressing mechanism 21 has performed the disk ejecting operation described above, the operator holds the front bezel 15 which projects from the chassis 18. Then the operator pulls the front bezel 15 in the A direction. Thereby, the tray 12 slides in the A direction as being supported by the guiding members 33, 34 via the slide rails 31, 32, as the slide rails 31, 32 which support the tray 12 at the two sides thereof slide.

The disk $D_A$ has thus passed through the braking member 51, and then the tray 12 reaches the disk replacement position at which the entirety of the disk $D_A$ loaded on the turntable 26 is exposed. Since the friction with the pair of braking members 51 caused the disk $D_A$ to stop turning as described above, the disk $D_A$ has been ejected in a state in which the disk $D_A$ has stopped turning. As a result, the operator can easily remove the disk $D_A$ from the tray 12 and replace it with a new one.

After the disk replacement, the operator operates and presses the front bezel 15 of the tray 12 in the B direction. After the tray 12 moves in the B direction, the slanting edge of the hook-shaped holding portion 41c of the holding member 41 slides on the pin 43 which stands on the chassis 18. Thus, the holding member 41 moves in the C direction. Then, after the slanting edge of the holding portion 41c has passed through the pin 43, the holding member 41 moves in the D direction and returns to the original position shown in FIG. 13. Engagement between the holding portion 41c of the holding member 41 and the pin 43 causes the tray 12 to be held to the chassis 18 in the original disk loading position.

In the second embodiment, when the tray 12 is loaded in the CD-ROM drive device 11A and the tray 12 slides in the B direction, the circumference of the disk $D_A$ comes into contact with the braking member 51. At this time, the disk $D_A$ rolls on the braking member 51. Therefore, it is possible to reduce a load on the tray 12 when the disk $D_A$ passes through the braking member 51. As a result, the arrangement of the braking member 51 in the second embodiment is advantageous in comparison to the arrangement of the pair of braking members 13 in the first embodiment. In the arrangement of the second embodiment, it is easier to load the tray 12 in the CD-ROM drive device than in the arrangement of the first embodiment. In fact, in the arrangement of the first embodiment, the disk $D_A$ has sliding frictional contact with the pair of braking members 13 which may prevent easy loading of the tray 12.

Application of the present invention is not limited to such a CD-ROM drive device as those in the above-described embodiments. The present invention can be similarly applied to other disk devices which handle other kinds of disk information recording media such as a compact disk, a magnetic disk, a magneto-opticla disk, an optical disk.

Further, application of the present invention is not limited to a disk device which is contained in a case of a notebook personal computer as described above. The present invention can be applied to a disk device contained in other kinds of electronic apparatus such as a desk-top personal computer and so forth, and also an apparatus used as an external apparatus separate from such electronic apparatus.

Further, application of the present invention is not limited to a case where the tray is manually operated as in the above-described embodiments. The present invention can be applied to a case where such a tray is moved by driving means such as a motor or the like.

According to the present invention, even in a case where a disk information recording medium rotates at high speed in an information reading operation, it is possible to perform the information reading operation at high speed, a braking member slides on the non-recordable surface or the circumference of the disk information recording medium when a tray thereof is drawn out together with the disk information recording medium. As a result, the disk information recording medium is braked to stop turning. Thus, the disk information recording medium can be ejected in a state in which the disk information recording medium has stopped turning.

Further, the present invention is not limited to the above-described embodiments, and variations and modifications may be made without departing from the scope of the present invention.

What is claimed is:

1. A disk device comprising:

a frame;

a tray provided with a disk holding and rotating means for holding and rotating a disk information recording medium, said tray being movable between a loading position and a replacement position, at which loading position said tray is loaded in said frame so that the disk information recording medium may be rotated and accessed, at which replacement position said tray projects from said frame and exposes said disk information recording medium from said frame so that said disk information recording medium may be replaced with another disk information recording medium; and a braking member, which is fixed to said frame, separated from the disk information recording medium when said tray, in which said disk information recording medium is loaded, is located at said loading position, and when said tray moves from said loading position to said replacement position, said disk information recording medium moves together with the tray and comes into contact with said braking member in a condition where said disk information recording medium is held by said disk holding and rotating means which is provided in said tray.

2. The disk device according to claim 1, wherein said braking member is located in a position such that said braking member comes into contact with a non-recordable surface of the disk information recording medium when said tray having said disk information recording medium loaded thereon projects from said frame and exposes said disk information recording medium from said frame.

3. The disk device according to claim 1, wherein said braking member is located in a position such that said braking member comes into contact with a circumference of said disk information recording medium when said tray having said disk information recording medium loaded thereon projects from said frame and exposes said disk information recording medium from said frame.

4. A disk device comprising a frame; a tray provided with a disk holding and rotating means for holding and rotating a disk information recording medium, said tray being movable between a loading position and a replacement position, at which loading position said tray is loaded in said frame so that the disk information recording medium may be rotated and accessed, at which replacement position said tray projects from said frame and exposes said disk information recording medium from said frame so that said disk information recording medium may be replaced with another disk information recording medium; a braking member, which is fixed to said frame, separated from the disk information recording medium when said tray, in which said disk information recording medium is loaded, is located at said loading position, said braking member coming into contact with said disk information recording medium when said tray moves from said loading position to said replacement position; and driving means for driving said tray so that said tray loaded in said frame is projected a predetermined distance from said frame in response to a predetermined operation being performed by an operator; wherein said braking member is provided in a position such that said braking member comes into contact with said disk information recording medium loaded on said tray when the operator further draws said tray, projecting said predetermined distance, from said frame so as to cause said disk information recording medium loaded on said tray to be exposed.

5. A disk device comprising a frame; a tray provided with a disk holding and rotating means for holding and rotating a disk information recording medium, said tray being movable between a loading position and a replacement position, at which loading position said tray is loaded in said frame so that the disk information recording medium may be rotated and accessed, at which replacement position said tray projects from said frame and exposes said disk information recording medium from said frame so that said disk information recording medium may be replaced with another disk information recording medium; a braking member, which is fixed to said frame, separated from the disk information recording medium when said tray, in which said disk information recording medium is loaded, is located at said loading position, said braking member coming into contact with said disk information recording medium when said tray moves from said loading position to said replacement position; and driving means for driving said tray so that said tray loaded in said frame is projected a predetermined distance from said frame in response to a predetermined operation being performed by an operator; wherein said braking member is provided in a position such that said braking member comes into contact with said disk information recording medium loaded on said tray, when said tray having the disk information recording medium loaded thereon has moved said predetermined distance and before the operator further draws said tray, projecting said predetermined distance, from said frame so as to cause said disk information recording medium loaded on said tray to be exposed.

6. A disk device comprising a frame; a tray on which a disk information recording medium is loaded, said tray being loaded in said frame so that information is read from said disk information recording medium when said disk is rotated, said tray projecting from said frame so as to expose the disk information recording medium from said frame when the disk information recording medium on said tray is replaced with another disk information recording medium; and a braking member provided on said frame in a position such that said braking member comes into contact with said disk information recording medium when said tray having said disk information recording medium loaded thereon projects from said frame and exposes said disk information recording medium from said frame; wherein said position at which said braking member is located is such that said braking member comes into contact with a circumference of said disk information recording medium when said tray having said disk information recording medium loaded thereon projects from said frame and exposes said disk information recording medium from said frame.

7. The disk device according to claim 6, further comprising driving means for driving said tray so that said tray loaded in said frame is projected a predetermined distance from said frame in response to a predetermined operation being performed by an operator; wherein said position at which said braking member is provided is such that said braking member comes into contact with said disk information recording medium loaded on said tray, when said tray having the disk information recording medium loaded thereon has moved said predetermined distance and before the operator further draws said tray, projecting said predetermined distance, from said frame so as to cause said disk information recording medium loaded on said tray to be exposed.

* * * * *